United States Patent [19]

Stewart et al.

[11] 4,184,601
[45] Jan. 22, 1980

[54] MICROWAVE SAFE VACUUM INSULATED CONTAINERS AND METHOD OF MANUFACTURE

[75] Inventors: Herbert M. Stewart; William J. Tanner, both of Nashville, Tenn.

[73] Assignee: Aladdin Industries, Incorporated, Chicago, Ill.

[21] Appl. No.: 934,475

[22] Filed: Aug. 17, 1978

[51] Int. Cl.² ............................................. A47J 41/02
[52] U.S. Cl. ..................................... 215/13 R; 65/34; 220/422
[58] Field of Search ........................ 65/34; 215/13 R; 220/402, 410, 422, 429

[56] References Cited

U.S. PATENT DOCUMENTS

| | | | |
|---|---|---|---|
| 1,012,547 | 12/1971 | Higbee | 65/34 |
| 2,633,264 | 3/1953 | Dinsmore | 215/13 R X |
| 2,839,209 | 6/1958 | Lester | 215/13 R |
| 3,096,897 | 7/1963 | Hansen | 215/13 R |
| 3,331,522 | 7/1967 | Bridges | 215/13 R |
| 3,910,441 | 10/1975 | Bramming | 215/13 R |
| 3,930,375 | 1/1976 | Hofmann | 220/422 X |
| 3,961,720 | 6/1976 | Potter | 215/13 R |

FOREIGN PATENT DOCUMENTS

703866  2/1954  United Kingdom ................. 215/13 R

*Primary Examiner*—Donald F. Norton
*Attorney, Agent, or Firm*—McDougall, Hersh & Scott

[57] ABSTRACT

Vacuum insulated containers are disclosed in which the usual metallic coating applied to the vacuum filler is omitted. In its place an electrically nonconducting, nonadsorbent granular material, such as finely divided silica, is employed in the annular, evacuated space to reduce infrared radiation loss. The construction is safe for use in microwave ovens and has a relatively high insulating efficiency as compared with vacuum fillers without infra barriers and nonvacuum insulated containers.

12 Claims, 5 Drawing Figures

MICROWAVE SAFE VACUUM INSULATED CONTAINERS AND METHOD OF MANUFACTURE

BACKGROUND OF THE INVENTION

This invention relates to the field of insulated containers. More specifically, it relates to a class of containers often referred to as vacuum ware which class includes thermos bottles, pitchers, carafes, and the like. A vacuum insulated container, such as a thermos bottle, is one of the most efficient thermal barriers presently known which can be produced at a reasonable cost for wide consumer distribution. Typically, a vacuum insulated container employs a glass or steel envelope or filler from which air is substantially evacuated. The liquid or semi-liquid to be thermally insulated is placed inside the filler to prevent heat loss or gain depending upon the initial conditions of the food stuff as compared with the ambient temperature.

In most vacuum constructions, particularly those which are intended to carry hot soup, coffee, cold beverages, and the like, it is desirable to provide a metallic coating or layer inside the walls of the vacuum filler. The metallic coating, usually silver, acts as a reflective barrier to reduce heat loss by radiation in the infrared region. This approach is commonly used when the filler is formed of glass. Metal fillers are also known. Such fillers are usually formed from stainless steel and loosely packed material is provided in the evacuated interior of the filler to perform a gettering function aiding in the maintenance of the vacuum. Charcoal, carbon black, and metal powders are common ingredients utilized for this purpose.

Other types of insulated containers which are in popular use include foam insulation, such as styrofoam or polyurethane. By comparison with vacuum bottles, however, foam is far inferior in its thermal insulating properties and, for example, will not satisfactorily maintain coffee at serving temperature over the course of a working day as will a vacuum insulated thermos bottle.

With the advent of the microwave oven and its wide consumer acceptance, there arises a need to provide a line of vacuum insulated containers which can be used in conjunction with microwave ovens. This would greatly facilitate the preparation of hot liquids at home for use at work or at school during the course of a day. Thus, soups, coffee or other liquids which may be stored in a refrigerator or at room temperature can be poured in a vacuum insulated container and then placed in a microwave oven for rapid heating. The container itself must be made from a material which will not adsorb microwave energy.

While the foregoing use of thermos bottles is highly desirable, unfortunately none of the designs presently on the market is suitable for use in microwave ovens. The all metal bottles may not be used in microwave ovens because they adsorb significant energy from joule heating due to eddy currents formed in the metal. Also, they may damage the microwave oven magnetron tube by reflecting the energy back down the wave guide. Glass fillers which are provided with a silver reflective coating are similarly unacceptable.

Accordingly, it is an object of the present invention to provide a new class of vacuum insulated containers which are safe for use in microwave ovens.

Another object of the invention is to provide a new class of vacuum insulated containers which have high thermal retention capabilities but which do not adsorb energy at microwave frequencies.

A further object of the invention is to provide a class of vacuum insulated serving pieces in which food can be heated in a microwave oven and then served, which serving pieces do not readily increase in temperature by drawing heat from the food placed therein.

Another object of the invention is to provide a class of vacuum insulated containers composed of materials neither electrically conductive nor made from materials which adsorb energy at microwave frequencies.

Other objects and advantages of the invention will be apparent from the remaining portion of the specification.

PRIOR ART STATEMENT

In accordance with the provisions of 37 CFR §1.97, applicants advise the closest prior art of which they are aware are the thermos bottle constructions described in the background portion of this specification and as exemplified in the following U.S. patents: Bridges U.S. Pat. No. 3,331,522, Bramming U.S. Pat. No. 3,910,441, and Potter U.S. Pat. No. 3,961,720.

Bridges discloses a metal vacuum bottle enclosed in a plastic jacket. Bramming discloses a glass vacuum bottle construction in which the interior walls are silver coated to reduce radiant heat loss. Potter discloses a cylindrical thermos bottle formed by sealing the ends of a pair of hollow concentric tubular members. The members may be metal or glass.

DETAILED DESCRIPTION

Figure 1:
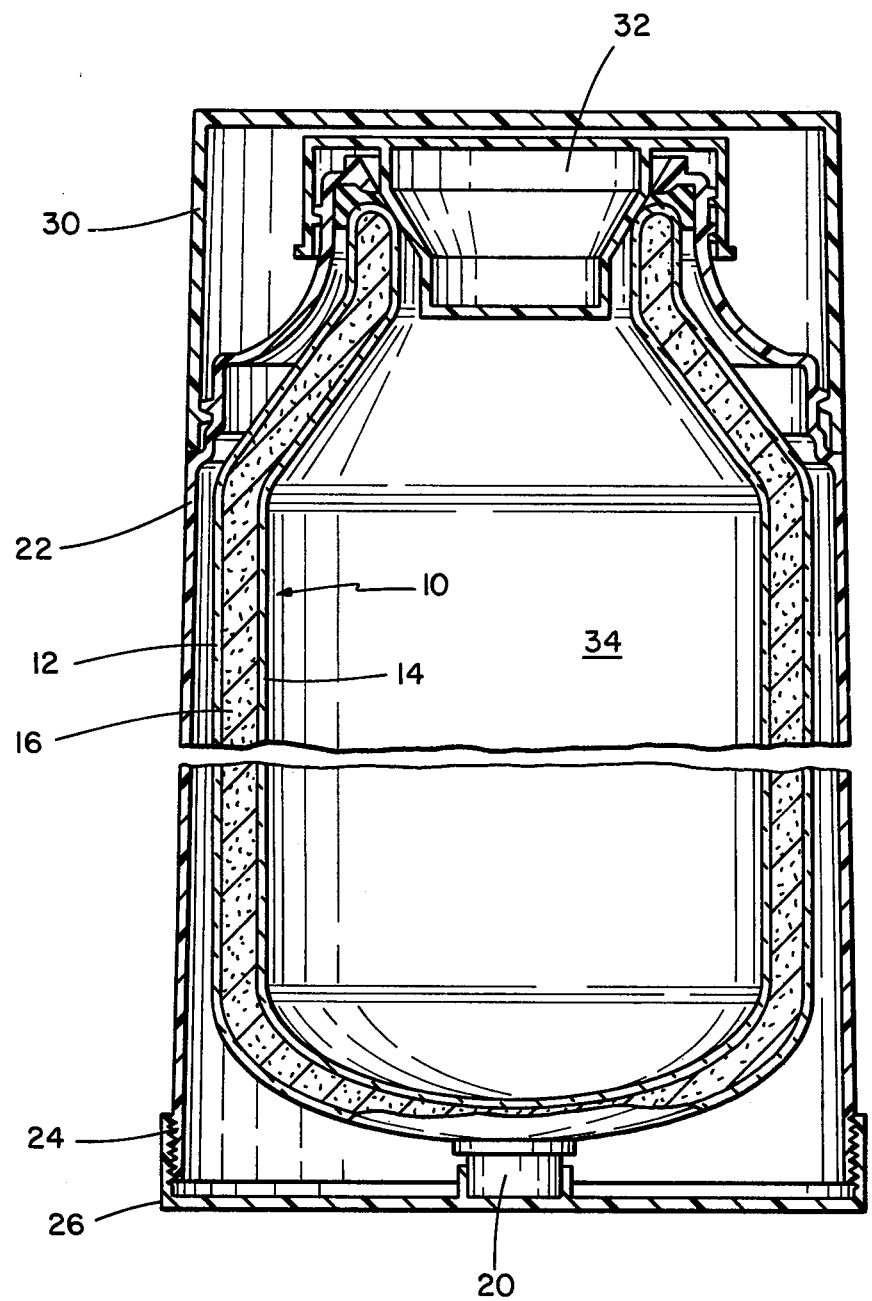
FIG. 1 is a sectional view through a thermos bottle according to the invention.
Figure 2:
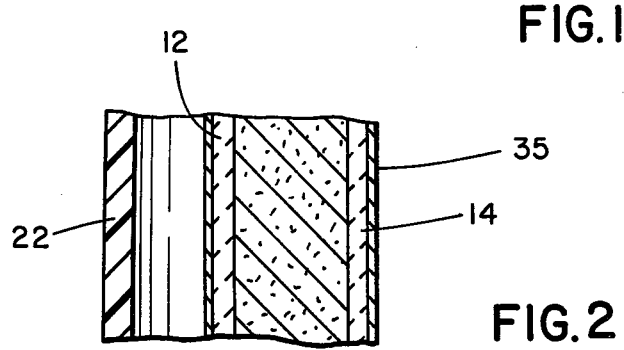
FIG. 2 is an enlarged sectional view of a portion of the filler wall.

Referring to FIG. 1, a thermos bottle or vacuum insulated container suitable for carrying liquids in the insulated interior portion thereof is illustrated. The bottle consists of a vacuum filler 10 comprising outer wall 12 and inner wall 14. An annular space 16 is defined between the inner and outer walls and air is evacuated therefrom through an opening in the bottom of the outer wall which is thereafter sealed with a plug and protective cap 20. In conventional constructions the filler 10 is formed of glass or metal. According to the present invention glass is preferable inasmuch as metal is not suitable for use in microwave ovens. Other electrically nonconducting materials, such as plastic, may be used, if desired, although glass is preferred.

In conventional glass filler constructions the inner surfaces of walls 12 and 14 are coated with a thin layer of silver. The purpose of the silver coating is to reduce the transmission of an infrared wave length radiation through the vacuum filler. As is known in this art, the insulating properties of a vacuum filler can be greatly improved by preventing the transmission of infrared wave length radiation. Thus, a coating which has a high reflectivity or, inversely, a low emissivity characteristic is desirable for this purpose.

As indicated in the background section of this specification, the presence of a silver coating is highly detrimental where the bottle is intended for use in a microwave oven. The silver coating results in joule heating and possible implosion of the filler when subjected to microwaves. Accordingly, it is desired to insulate the bottle against infrared radiation loss without the use of silver or other metallic coatings to permit its use in a microwave oven.

According to the present invention the silver coating is omitted and in its place the annular space between the walls 12 and 14 is substantially filled with finely divided materials which are neither electrically conductive nor adsorbant at microwave frequencies. Examples of such materials include finely divided silica and calcium carbonate. It is necessary that these materials be electrically nonconductive since microwave heating is accomplished by induced currents in conductive materials when subjected to microwaves. The infrared insulating property of these compounds is, however, the matter of greater moment. These compounds, when provided in the evacuated space 16 between walls 12 and 14, provide insulation against infrared energy transmission of approximately the same magnitude as the metallic coatings known in the prior art. While the mechanism for this insulating characteristic is not completely understood, it is believed that the following is an accurate explanation.

The finely divided materials, silica or calcium carbonate, when packed in the annular space absorb the infrared energy but radiate it poorly due to the small temperature difference between individual particles. This is because radiation is a function of the fourth power of absolute temperature. When two surfaces, such as the surfaces of two adjacent particles inside an evacuated glass filler, are at nearly the same temperature the energy radiated one to the other is nearly equal and hence the net energy transfer is negligible. Conversely, if there is a significant temperature difference between the surfaces, the energy transfer rapidly becomes significant due to the fourth power relationship.

Thus, the infrared loss across the filler walls is small and substantially less than when the evacuated space 16 has neither a silver coating nor finely divided, nonadsorbing materials. By providing finely divided silica or calcium carbonate in the annular space 16, a vacuum bottle is obtained which has substantially the same heat retention characteristics as a conventional thermos bottle having a glass filler, the walls of which are coated with silver. The bottle according to the invention performs substantially better than a bottle employing a glass vacuum filler without an infrared barrier. The following data is exemplary of this:

|  | Heat Loss |
| --- | --- |
| Pint glass vacuum filler without silver coating | 0.25Kcal/Hr/°C. |
| Pint glass vacuum filler with silver coating | 0.052Kcal/Hr/°C. |
| Pint glass vacuum filler without coating but with nonadsorbent, nonconducting, finely divided granular material (silica) | 0.078Kcal/Hr/°C. |

The selection of the granular material to be provided in the annular space 16 will depend to some extent upon cost, availability and size. In addition, it is desirable that the granular material have some gettering capability so as to maintain the vacuum as against any small amounts of air which may out gas or leak into the evacuated space. Silica and calcium carbonate are particularly suitable choices for this purpose.

The manufacture of the filler 10 according to the present invention is similar to the manufacture of glass fillers for conventional use. The fillers are formed of automatic machinery well known in the art. Instead of applying a silver coating, however, the granular material is placed into the annular space 16 prior to evacuation. During the evacuation process, which is usually accomplished by means of a vacuum pump, fiberglass batting or other air permeable material may be placed across the filler opening to prevent the vacuum pump from sucking the granular material out of the space 16. After the space 16 has been evacuated, plug 20 is applied to seal the filler.

The filler is then ready for insertion into a standard vacuum bottle jacket, such as jacket 22 in FIG. 1. The bottom of the jacket is provided with threads 24 to receive a base 26. The upper portion of the jacket is adapted to threadingly receive a cup 30. A stopper 32 engages the opening in the upper portion of the filler 10 to seal the insulating interior 34 of the filler. If desired, of course, the filler may be provided with an inner liner 36 for added protection against possible breakage of the liner and contamination of the foodstuffs contained therein.

As indicated, the essential features of the granular material are that it be electrically nonconductive and nonadsorbent at microwave frequencies so that it may be used in a microwave oven and that it be finely divided so as to have low energy transfer characteristics with respect to infrared radiation. Also, it is desirable that the material have some gettering capability and it follows from that requirement that it must not release air (out gas) or sublimate under vacuum conditions.

Thermos bottles formed according to the present invention may be filled with liquids or semi-liquids and then placed in a microwave oven for rapid heating of the contents of the bottle without damage to the bottle or heating of the bottle by the microwaves or the heated liquids. The heated contents are then sealed by placing the stopper 32 in position and the contents will remain at approximately the initial temperature for substantial periods of time as is the case with conventionally available thermos constructions.

Figure 3:
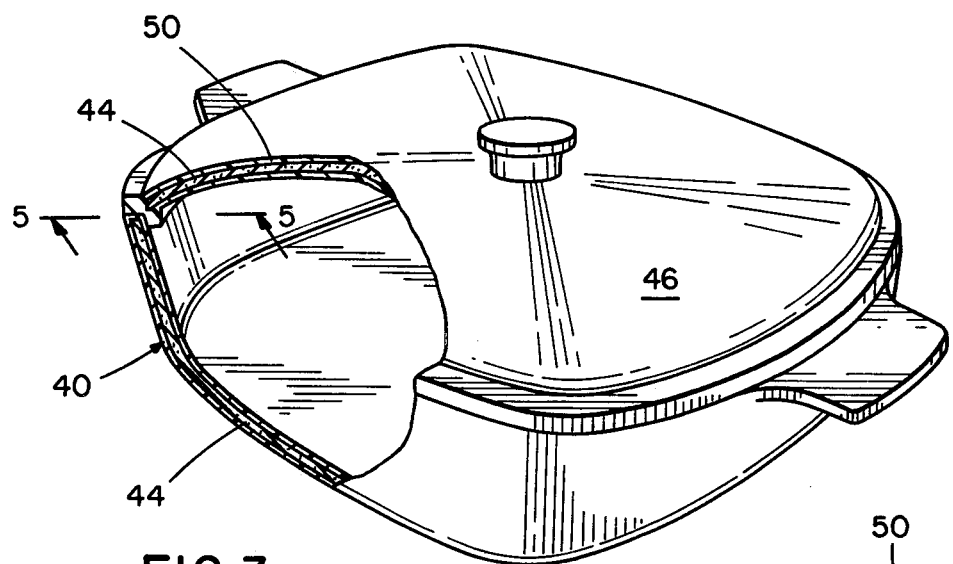
FIGS. 3 and 4 are perspective views with portions cut away of insulated serving pieces according to the invention.
Figure 5:
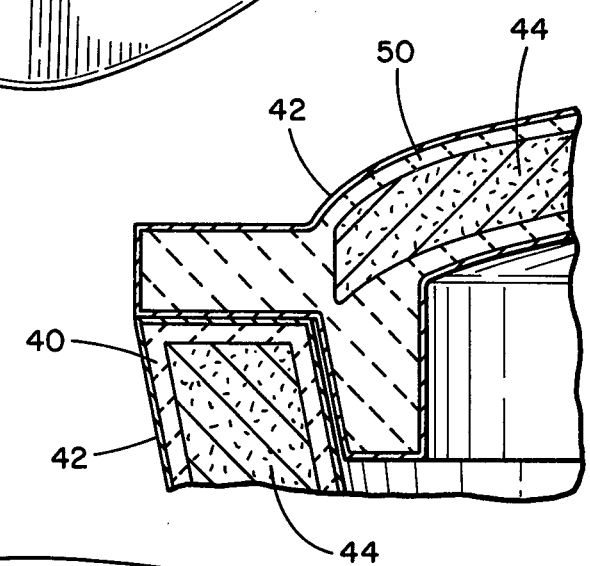
FIG. 5 is a partial cross sectional view of the serving piece of FIG. 3.
Figure 4:
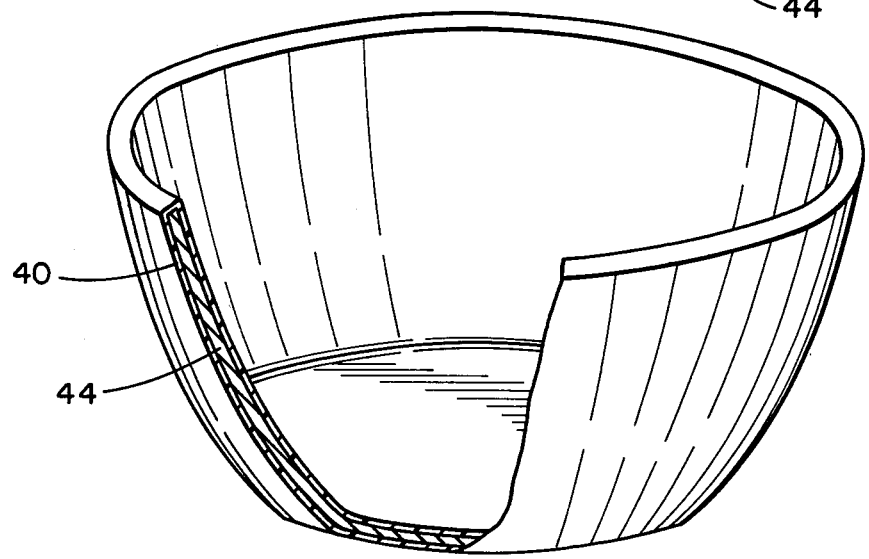

Referring now to FIGS. 3-5, additional constructions according to the invention are illustrated. These figures illustrate selected embodiments of a large class of serving pieces which can employ the teachings of the present invention. Where it is desired to heat liquids or solids in a microwave oven it is often desirable to serve such foods in the same container in which they have been heated in order to facilitate meal service.

A problem with most serving pieces, particularly those suited for use in microwave ovens, is their propensity to conduct heat away from the food after removal from the oven. This is due to the unique characteristic of microwave ovens wherein only the food becomes hot while its container stays cool. It is desirable to provide serving pieces which are capable of use in a microwave oven but which nevertheless do not tend to conduct heat away from the food when they are removed from the oven and placed on the table. According to the embodiments of the invention illustrated in FIGS. 3-5, this objective is achieved by use of serving pieces incorporating vacuum fillers constructed according to the present invention.

A vacuum insulated filler 40, preferably formed of glass, is provided surrounded by a thin walled protective jacket 42. The vacuum filler is constructed according to the present invention wherein finely granular material 44 is received in the evacuated space between the filler walls. This construction permits its use in a microwave oven while at the same time providing the desired high thermal insulating barrier to prevent the bowl from conducting heat away from the food.

These serving pieces will, in fact, maintain food at a desired serving temperature for periods significantly longer than comparable ceramic, china or metal serving pieces because of the high insulating capability of the vacuum filler including its infrared barrier. In fact, the only substantial loss of temperature is from the open top which, of course, may be closed with a suitable cover 46. The cover may be insulated in any conventional manner as, for example, with foam or powdered cork although, if desired, an additional vacuum insulated filler 50, according to the invention, could be incorporated into the cover to provide a truly efficient insulated food service container.

While FIGS. 3 and 4 illustrate two different configurations of serving pieces, it is contemplated that the present invention is suitable for incorporation into an entire line of microwave safe serving pieces including, but not limited to, carafes, pitchers, bowls, platters, pots, casserole dishes, etc.

While we have shown and described embodiments of this invention in some detail, it will be understood that this description and illustrations are offered merely by way of example, and that the invention is to be limited in scope only by the appended claims.

We claim:

1. A vacuum insulated container construction including an infrared radiation barrier which is safe for use in microwave ovens comprising:
   (a) a glass filler formed in the general shape of a container having inner and outer walls and defining an annular space between said walls, air being substantially evacuated from said annular space, said inner wall defining a thermal insulating container interior,
   (b) an infrared barrier formed by an electrically nonconducting granular material which does not adsorb microwave energy provided in the annular space between said walls in an amount sufficient to substantially fill said space,
   (c) means surrounding said filler, at least on the outer wall thereof, for protecting against damage to said filler.

2. The container according to claim 1 further including a cover formed of insulating material and dimensioned to be received on said filler for sealing the insulating interior to further reduce heat loss.

3. The container according to claim 2 wherein said cover includes a vacuum filler and an infrared barrier as set forth in elements (a) and (b) of claim 1.

4. The container according to claim 1 wherein said vacuum filler is constructed to form a container selected from the group comprising: thermos bottles, bowls, pitchers, platters, pots, carafes, casserole dishes.

5. The container according to claim 1 wherein said granular material is selected from the group comprising: finely divided silica and finely divided calcium carbonate.

6. The container according to claim 1 wherein said protective means is a plastic jacket.

7. The container according to claim 6 wherein said jacket extends into the heat retaining interior of the container to form a liner between the contents of the container and said inner wall.

8. A vacuum filler construction including an infrared radiation barrier which is safe for use in microwave ovens comprising:
   (a) a glass filler formed in the general shape of a container having inner and outer walls and defining an annular space between said walls, air being substantially evacuated from said annular space, said inner wall defining an insulating container interior,
   (b) an infrared barrier comprising an electrically nonconducting granular material which does not adsorb microwave energy provided in the annular space between said walls in an amount sufficient to substantially fill said space.

9. The construction according to claim 8 wherein said granular material is selected from the group comprising: finely divided silica and finely divided calcium carbonate.

10. A method of making a vacuum filler construction including an infrared radiation barrier which is safe for use in microwave ovens comprising the steps of:
    (a) forming a glass filler in the general shape of a container, said filler having inner and outer walls and defining an annular space therebetween, the filler being provided with a sealable opening through one of said walls,
    (b) substantially filling the annular space between the walls with an infrared barrier comprising an electrically nonconducting granular material which does not adsorb microwave energy,
    (c) forming a partial vacuum in the annular space by withdrawing air through said sealable opening, and
    (d) sealing said opening.

11. The method according to claim 10 wherein step (c) includes the substep of placing an air permeable material over said sealable opening when forming said partial vacuum to prevent the granular material from being drawn out of the annular space.

12. The method according to claim 10 wherein said granular material is selected from the group comprising: finely divided silica and finely divided calcium carbonate.

* * * * *